(12) United States Patent
Gillissen et al.

(10) Patent No.: US 12,371,904 B2
(45) Date of Patent: Jul. 29, 2025

(54) PRINTED HEATER ELEMENTS INTEGRATED IN CONSTRUCTION MATERIALS

(71) Applicant: HENKEL AG & CO. KGAA, Duesseldorf (DE)

(72) Inventors: Stijn Gillissen, Hasselt (BE); Inge Vander Meulen, Veldhoven (NL); Gunther Dreezen, Balen-Olmen (BE)

(73) Assignee: E2IP Technologies inc., Saint-Laurent (CA)

( * ) Notice: Subject to any disclaimer, the term of this patent is extended or adjusted under 35 U.S.C. 154(b) by 499 days.

(21) Appl. No.: 15/832,303

(22) Filed: Dec. 5, 2017

(65) Prior Publication Data

US 2018/0094434 A1    Apr. 5, 2018

Related U.S. Application Data

(63) Continuation of application No. PCT/EP2016/062936, filed on Jun. 8, 2016.

(30) Foreign Application Priority Data

Jun. 16, 2015  (EP) .................................. 15172244

(51) Int. Cl.
*E04C 2/52* (2006.01)
*B32B 7/12* (2006.01)
(Continued)

(52) U.S. Cl.
CPC .............. *E04C 2/525* (2013.01); *E04C 1/392* (2013.01); *F24D 13/02* (2013.01); *H01C 7/021* (2013.01);
(Continued)

(58) Field of Classification Search
CPC ......... E04C 2/525; F24D 13/02; H05B 3/145; H05B 3/26
See application file for complete search history.

(56) References Cited

U.S. PATENT DOCUMENTS 3,898,422 A * 8/1975 Fuller .................... H01C 7/022
                                                     123/549
4,277,542 A    7/1981 Boonstra et al.
(Continued)

FOREIGN PATENT DOCUMENTS

EP    0918339 A2   5/1999
EP    1544869 A1   6/2005
(Continued)

OTHER PUBLICATIONS

R. W. Warfield, Thermodynamic properties of polyethylene, 1961, Chemistry Research Department, Naval Ordnance Laboratory, White Oak, Silver Spring, Maryland, U.S.A. (Year: 1961).*
(Continued)

*Primary Examiner* — John J Norton
*Assistant Examiner* — Franklin Jefferson Wang
(74) *Attorney, Agent, or Firm* — BENOIT & COTE (57) ABSTRACT

The present invention relates to a heating element, which is integrated into the construction material. Integration of the heating element according to the present invention into the construction material limits space needed for the heating system. In addition, the used heating element provides reduced power consumption compared to conventional technologies. A construction element according to the present invention comprises a construction material, a heating element comprising a foil comprising a PTC composition layer or a PTC composition layer, at least one adhesive layer, a substrate and a connector, wherein said heating element is embedded between said construction material and said substrate, and wherein said PTC layer comprises a semi-
(Continued)

crystalline material, at least one binder and an electronically conductive material.

15 Claims, 4 Drawing Sheets (51) Int. Cl.
| | |
|---|---|
| E04C 1/39 | (2006.01) |
| F24D 13/02 | (2006.01) |
| H01C 7/02 | (2006.01) |
| H05B 3/06 | (2006.01) |
| H05B 3/14 | (2006.01) |
| H05B 3/26 | (2006.01) |
| H05B 3/28 | (2006.01) |

(52) U.S. Cl.
CPC ............... *H01C 7/027* (2013.01); *H05B 3/06* (2013.01); *H05B 3/145* (2013.01); *H05B 3/146* (2013.01); *H05B 3/26* (2013.01); *H05B 3/28* (2013.01); *B32B 7/12* (2013.01); *B32B 2307/202* (2013.01); *F24H 2250/04* (2013.01); *H05B 2203/011* (2013.01); *H05B 2203/013* (2013.01); *H05B 2203/02* (2013.01); *H05B 2203/026* (2013.01); *Y02B 30/00* (2013.01)

(56) References Cited

U.S. PATENT DOCUMENTS

| | | | |
|---|---|---|---|
| 4,777,351 A | 10/1988 | Batliwalla et al. | |
| 5,181,006 A | 1/1993 | Shafe et al. | |
| 5,993,698 A * | 11/1999 | Frentzel | H01C 7/028 252/511 |
| 9,392,645 B2 * | 7/2016 | Mikkelsen | H01C 7/021 |
| 2002/0161090 A1 * | 10/2002 | Blok | H01C 17/06586 524/425 |
| 2004/0113127 A1 * | 6/2004 | Min | H01C 7/049 252/500 |
| 2006/0138123 A1 * | 6/2006 | Ishii | H01C 7/027 219/505 |
| 2011/0021103 A1 * | 1/2011 | Alper | A61F 13/4902 442/329 |
| 2011/0155716 A1 * | 6/2011 | Jacob | F28F 21/045 219/482 |
| 2011/0297665 A1 * | 12/2011 | Parker | H05B 3/22 219/494 |
| 2013/0186884 A1 * | 7/2013 | Barfuss | B23P 11/00 219/529 |
| 2016/0121993 A1 * | 5/2016 | Nehring | B64C 1/18 244/118.5 |

FOREIGN PATENT DOCUMENTS

| | | | |
|---|---|---|---|
| JP | 2005282260 A | | 10/2005 |
| JP | 2008091308 A | * | 4/2008 |
| JP | 2008103233 A | | 5/2008 |
| WO | 0156333 A1 | | 8/2001 |

OTHER PUBLICATIONS

JP-2008091308-A (Kobayashi Munenori) Apr. 17, 2008 [retrieved on Mar. 7, 2025]. Retrieved from Espacenet Database, translation by EPO and Google. (Year: 2008).*

* cited by examiner

PRINTED HEATER ELEMENTS INTEGRATED IN CONSTRUCTION MATERIALS

TECHNICAL FIELD OF THE INVENTION

The present invention relates to heating elements comprising positive temperature coefficient material (PTC), and which can be integrated into construction materials.

BACKGROUND OF THE INVENTION

Conventional house heating is done by using water radiators, stoves or electrical heaters. All of these heating methods have the disadvantage that they take up a lot of space and are always visible. In addition, the installation of the heating system is always an additional step in the building process.

One attempt to reduce the space the heating element takes, is a water based floor heating system. The water based floor heating take less space than ordinary radiators, however, they still take some room as they lift the floor 5 cm or more. In addition, an additional step is required in the building process. The water based floor heating system offers a partial solution for being invisible. However, a water based floor heating system is not easily installed in walls and/or ceiling. Furthermore, it requires significant construction efforts to get installed.

A solution to reduce the space the heating element takes has been printed heater foils, which have been in the market for some years. These heater foils can be installed under a floor or behind a wall and/or ceiling. A heating system based on these printed foils is rather inflexible. The configuration of the room needs be set before installation in order of the heater to function properly. Therefore, the furniture should stay in its place based on where the heating system has been installed.

Figure 1A:
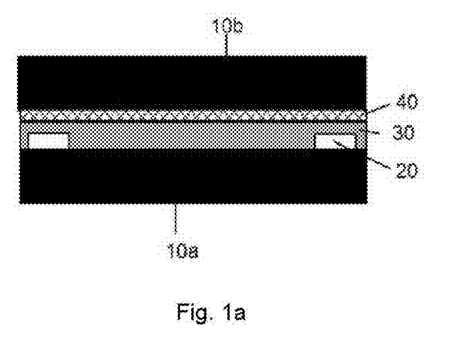
FIG. 1a illustrates the structure of printed heating element according to the prior art.
Figure 1B:
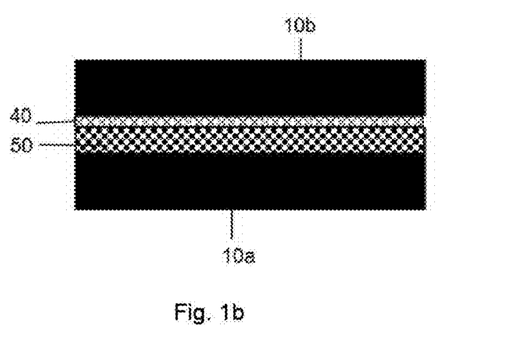
FIG. 1b illustrates an alternative printed heating element according to the prior art.

A conventional heating element based on a printed heater foil consist of minimal three components that can make up the heating element. This structure is illustrated in FIGS. 1a and 1b. FIG. 1a illustrates how electrically conducting busbars (20), that bring in the electrical current, are deposited on a carrier or substrate (10a). A thin layer of a resistive (FTC) carbon ink (30) is applied in-between the busbars. The resistive (PTC) carbon ink (30) will heat up when a voltage is applied between the busbar electrodes. The heating element is protected from the top side by an adhesion layer (40) and a secondary substrate (10b). This adhesion layer (40) can be formed from multiple material layers. Some examples are dielectric coating and laminating adhesive; laminating adhesive alone. Alternatively, active materials (20+30) can be combined into one layer to form the heating element (50), as illustrated in FIG. 1b.

As described above, conventional heating elements have not been integrated into construction materials. The construction material, for example wall or floor are always independently installed before or after installation of the heating system, for example water radiators or water floor heating.

Other type of heaters can be integrated in construction elements, such as water pipes and electrical cables (copper wire), which need air vents and other construction alteration.

Therefore, there is still a need for a heating element which is taking into consideration all of the drawbacks described above.

SUMMARY OF THE INVENTION

The present invention relates to a construction element comprising, a) a construction material; b) a heating element comprising a foil comprising a PTC composition layer or a PTC composition layer; c) at least one adhesive layer; d) a substrate; and e) a connector, wherein said heating element is embedded between said construction material and said substrate, and wherein said PTC layer comprises 1) a semi-crystalline material; 2) at least one binder; and 3) an electronically conductive material.

DETAILED DESCRIPTION OF THE INVENTION

In the following passages, the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

When an amount, a concentration or other values or parameters is/are expressed in form of a range, a preferable range, or a preferable upper limit value and a preferable lower limit value, it should be understood as that any ranges obtained by combining any upper limit or preferable value with any lower limit or preferable value are specifically disclosed, without considering whether the obtained ranges are clearly mentioned in the context.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

The present invention provides a construction element comprising, a) a construction material; b) a heating element comprising a foil comprising a PTC composition layer or a PTC composition layer; c) at least one adhesive layer; d) a substrate; and e) a connector, wherein said heating element is embedded between said construction material and said substrate, and wherein said PTC layer comprises 1) a semi-crystalline material; 2) at least one binder; and 3) an electronically conductive material.

The heating system provided by the present invention does not take up any additional space in the house/room it has been installed, as it is fully integrated into the construction element. The heating system provided by the present invention can be installed in a simpler and faster process, because heating elements are installed together with the installation of the floor/wall/ceiling construction elements. Furthermore, the use of the PTC composition provides additional energy consumption reduction and intrinsic build in safety against overheating.

'Positive Temperature Coefficient' or 'PTC' materials are conductive materials characterized by a sharp increase in resistivity upon reaching a PTC temperature (Ts). A function/curve of the electrical resistivity with temperature has a positive slope and within this temperature range, the electrically conducting polymeric PTC composition is said to have a positive coefficient of temperature resistance (PTCR). If the increase in resistivity is sufficiently steep, the resistivity effectively blocks the current and further heating of the material such as overheating of the material is prevented. One of the main benefits of PTC materials is that no additional regulating electronic circuits are necessary in an article that comprises a PTC material, since the PTC material itself has a characteristic similar to regulating electronic circuits. Moreover, upon cooling, the PTC material resets itself. This jump in resistivity may often be referred to as the PTC ratio and may be defined as the ratio of the maximum volume resistivity to the volume resistivity at room temperature (approximately 23° C.).

The construction element according to the present invention and all of its features will be discussed in details below.

In one embodiment, the construction element according to the present invention is a floor element. Non-limiting examples of suitable floor elements are laminate planks, parquet planks, carpet, vinyl planks and tiles.

In another embodiment, the construction element according to the present invention is a wall element. Non-limiting examples of suitable wall elements are dry wall, gypsum board, plaster board and wall paper (for example glass fibre reinforced wall paper).

Yet in another embodiment, the construction element according to the present invention is a ceiling element. Non-limiting examples of suitable ceiling elements are gypsum board and ceiling tiles.

A construction element according to the present invention comprises a construction material. Suitable construction material is selected based on the final construction element and whether it is a floor, wall or ceiling element. Non-limiting examples are laminate planks, parquet planks, carpet, vinyl planks, tiles, dry wall, gypsum board, plaster board, wall paper and ceiling tiles.

A construction element according to the present invention comprises a heating element comprising a foil comprising a PTC composition layer or a PTC composition layer.

In one embodiment, a construction element according to the present invention comprises a heating element comprising a foil comprising a PTC composition layer. The PTC composition will be discussed in details below.

The PTC composition layer is applied onto the surface of the foil. Non-limiting examples of suitable foil materials for use in the present invention are polyethylene terephthalate (PET), polyethylene (PE), polyimide (PI), polyvinylchloride (PVC), polystyrene (PS), paper, cardboard and FSR boards.

There is no need to use an adhesive to adhere the PTC composition layer onto the surface of the foil, it can be printed directly. In addition, separate curing step is not required, as the solvent, if present, evaporates during drying.

The PTC composition can be applied onto the surface of a foil by various techniques. Suitable techniques for use herein are for example screen printing, roll printing, roller coating, rotary screen printing and dispensing. Separate curing step is not required and is therefore optional, as the solvent, if present, evaporates during drying.

In addition to the PTC composition layer, the foil also has silver or copper busbars applied onto the surface of the foil to form a functional heating element. Voltage is applied between the busbars. Example of suitable commercially available material to for busbars is silver ink Loctite ECI 1010 from Henkel.

In one embodiment according to the present invention, the heating element comprising a foil comprising a PTC composition layer is covering at least 15% of the surface of said construction material, preferably at least 20%, more preferably at least 25%.

In one embodiment according to the present invention, the heating element comprising a foil comprising a PTC composition has a thickness from 5 µm to 5 mm, preferably from 10 µm to 1 mm, more preferably from 15 µm to 500 µm and most preferably from 25 µm to 150 µm.

Optionally, a protective coating may be applied onto the PTC composition layer. The protective layer is to provide moisture barrier properties and mechanical protection. Said protective layer can be a dielectric, a conformal coating material, or a PSA with a substrate. Suitable coating layer material need to survive the working temperature of the heating element and should not react with the PTC composition. Said protective coating may be acrylate based coating, such as commercially available LOCTITE EDAG PF 455B.

In another embodiment, heating element comprises a PTC composition layer and it will be applied directly onto the surface of a construction material. PTC composition layer will adhere on its own, and there is no need for use of adhesive to adhere the PTC composition layer to a construction material. In addition, separate curing step is not required, as the solvent, if present, evaporates during drying. PTC composition will be discussed in details below.

The PTC composition can be applied onto a surface of a construction material by various techniques. Suitable techniques for use herein are for example screen printing, roll printing, roller coating, rotary screen printing and dispensing. Separate curing step is not required and is therefore optional, as the solvent, if present, evaporates during drying.

In addition to PTC composition layer, construction material also has silver or copper busbars applied onto the surface of construction material. Voltage is applied between the busbars.

In this embodiment, the PTC composition layer is covering at least 15% of the surface of said construction material, preferably at least 20%, more preferably at least 25. In addition, the PTC composition layer has a thickness from 2.5 µm to 100 µm, preferably from 3 µm to 50 µm, more preferably from 5 µm to 15 µm.

Optionally, in this embodiment, a protective coating can be applied onto the PTC composition layer. The protective layer is to provide moisture barrier properties and mechanical protection. Protective coating may be acrylate based coating, such as commercially available LOCTITE EDAG PF 455B from Henkel.

A construction element according to the present invention comprises at least one adhesive layer. The adhesive layer(s) may have multiple functions in a construction element according to the present invention. In addition to adhesive function, adhesive layer may provide moisture barrier properties, thermal conductivity or insulation, (EMF) shielding, mechanical protection, or a combination of all of the above.

An adhesive layer can be used to adhere for example a foil comprising a PTC composition layer to a construction material. Alternatively adhesive layer can be used to adhere a substrate to a foil comprising a PTC composition layer. Or to adhere a second construction material layer to the construction element.

When more than one adhesive layer is present, they can be the same adhesive or two or more different adhesives. Suitable adhesives for use in the present invention need to survive the working temperature of the heating element and should not react with the PTC composition. Suitable adhesives for use in the present invention are epoxides, silicones, polyurethanes, (meth)acrylates, ethylvinyl acetate (EVA) and pressure sensitive adhesive (PSA).

Suitable commercially available adhesives for use in the present invention are for example Durotak 3954, Loctite Liofol 3649 with Loctite Liofol LA 6255, Durotak 2954 all from Henkel.

A construction element according to the present invention comprises a substrate. The substrate can be used to protect the heating element in the construction element. Another purpose of the substrate is to hide the heating element. Mainly the substrate can be used as a decorative layer. Suitable substrates are for example wall paper (glass fibre enforced), polyethylene terephthalate (PET), polyethylene (PE), polyimide (PI), polyvinylchloride (PVC), polystyrene (PS), cardboard and FSR boards.

A construction element according to the present invention comprises a connector. The connector is the appliance, which connects a construction element according to the present invention either to another construction element or to a source of electricity. An example of such connectors are AMP crimp barrel foil connectors that are clinched through the heater foil element on one side and have a cable connection at the other side.

A construction element according to the present invention has a foil comprising a PTC composition layer or a PTC composition layer embedded between said construction material and said substrate. In the following, structural aspects of some embodiments of the present invention are discussed in details.

Figure 2:
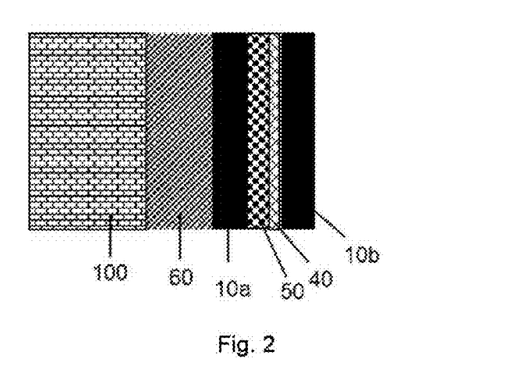
FIG. 2 illustrates basic embodiment of the construction element according to the present invention, wherein the heating element comprises a foil comprising a PTC composition layer.

In one embodiment according to the present invention, as illustrated in FIG. 2, the heating element is integrated in the construction material (100) by attaching the foil (10a) comprising the PTC composition layer (50) to the construction material. The adhesive layer (60) is used to adhere the foil to the construction material (alternatively this can be done also mechanically). The adhesive layer (40) is used as a protective layer for PTC composition. The adhesive layer (40) is used to adhere the substrate (10b) to cover the PTC composition layer. In this embodiment, the complete thickness of the layers 60 and 10a and 50 and 40 and 10b is less than 1 mm, therefore, the integrated heating element does not increase the thickness of the construction material significantly.

Figure 3:
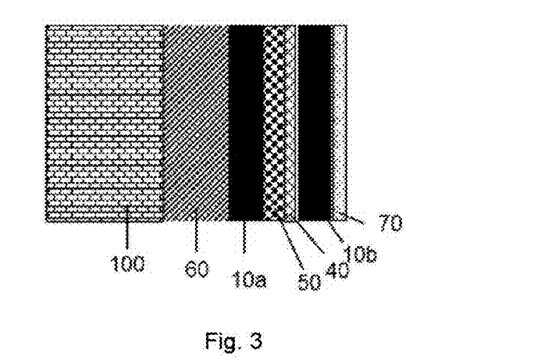
FIG. 3 illustrates one embodiment of the construction element according to the present invention comprising an additional substrate.

In another embodiment according to the present invention, as illustrated in FIG. 3, the additional substrate (70) can be applied onto the substrate (10b). In most cases this additional substrate is a decorative layer, which is covering the construction element and providing aesthetically pleasing appearance.

Figure 4:
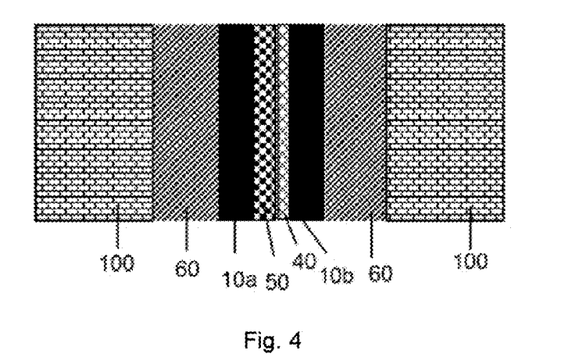
FIG. 4 illustrates one embodiment of the construction element according to the present invention, wherein the heating element is sandwiched between two construction material layers.

Yet in another embodiment according to the present invention, as illustrated in FIG. 4, another layer of the construction material (100) is applied onto the substrate (10b). The second layer of construction material is preferably adhered by the adhesive layer (60) so that the heating element is sandwiched between two layers of construction material. In this embodiment, a laminated construction element is generated. In this embodiment, the construction materials (100) can be the same or different.

Figure 5:
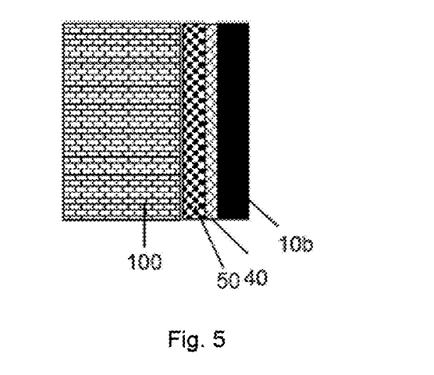
FIG. 5 illustrates basic embodiment of the construction element according to the present invention, wherein heating element is a PTC composition layer.

Yet, in another embodiment according to the present invention, as illustrated in FIG. 5, the PTC composition layer (50) is incorporated into the construction element by applying it directly onto the surface of the construction material. The PTC composition layer is protected by the adhesive layer (40) and the substrate (10b).

Alternatively, if the construction material is constructed from several layers of material(s) the PTC composition layer (50) can also be applied between any of these layers. This way the PTC composition layer (50) is integrated into the interior of the construction material. Depending on the materials used in the construction element, it may be possible that no additional protective layer is required to protect the PTC composition layer (50). In this case the protection is done by the construction material itself.

Figure 6:
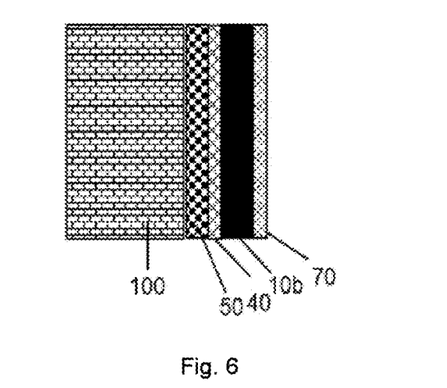
FIG. 6 illustrates another embodiment of the construction element according to the present invention, wherein heating element comprises a PTC composition layer.

In one embodiment according to the present invention, the PTC composition layer (50) is applied directly onto the surface of a construction material (100), wherein an adhesive layer (40) is applied on top of the PTC composition layer (50) followed by the substrate (10b) and the decorative layer (70). This embodiment is illustrated in FIG. 6.

Figure 7:
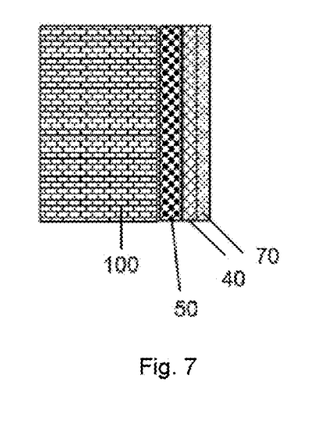
FIG. 7 illustrates another embodiment of the construction element according to the present invention, wherein heating element comprises a PTC composition layer.

In one embodiment according to the present invention, the decorative layer (70) is adhered directly on top of the PTC composition layer (50) with the adhesive layer (40). The adhesive layer (40) needs to have protective functionalities. This embodiment is illustrated in FIG. 7.

Figure 8A:
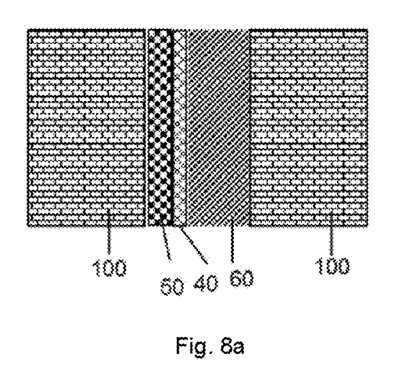
FIG. 8a illustrates another embodiment of the construction element according to the present invention, wherein the heating element is sandwiched between two construction material layers and a protective layer.
Figure 8B:
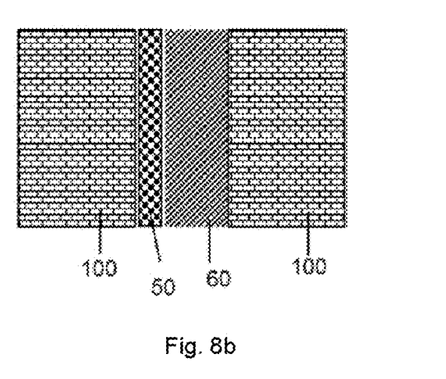
FIG. 8b illustrates an alternative embodiment without a protective layer.

In another embodiment according to the present invention the decorative layer (70) can be replaced by another layer of the construction material (100) in order the PTC composition layer to be sandwiched between the two construction materials. The protective adhesive layer (40) is optional in this case, because the adhesive layer (60) may provide the same functions and properties. These embodiments are illustrated in FIGS. 8a and 8b.

A construction element according to present invention comprises a layer of a PTC composition, which can be in a form of an ink, a paste or a hotmelt.

A PTC composition used in the present invention comprises 1) a semi-crystalline material; 2) at least one binder; and 3) an electronically conductive material. In some embodiments, the PTC composition also comprises a solvent.

The PTC composition is free from any halogen containing material. By the term free of any halogen containing material is meant herein that composition comprises halogen ions less than 0.1% by weight of the total weight of the composition, preferably less than 0.01%.

Each essential component of the PTC composition is described in details below.

Semi-Crystalline Material

A PTC composition comprises a semi-crystalline material. Semi-crystalline material can also be referred as an active material in the PTC composition.

Semi-crystalline polymers exhibit significant volume increases via phase transitions at certain temperatures, and this enables these polymers to have the unique capability of "off-on" control, i.e., a "temperature switch". These semi-crystalline polymers are crystalline below the "temperature switch" and amorphous above it.

Semi-crystalline material suitable for use in the present invention is prepared by conventional means known by the skilled person.

It is preferred that the semi-crystalline material used in the present invention has a high enthalpy, and a narrow melting peak. These features are required to formulate a desired PTC ink with high PTC ratio. For example material, which has a high enthalpy, but at the same time has a broad melting peak, the resistance increases "early" and slowly, there is no rapid heating, no rapid shut down of the system and the PTC ratio is low.

Suitable, and preferred semi-crystalline material to be used in the present invention has a melt enthalpy greater than 150 J/g according to ASTM E793.

For example, example 4.1 in the experimental section exemplify a very good semi-crystalline material. Composition of example 4.1 has a high melt enthalpy together with a narrow melt peak. This gives no resistance increase in the beginning, but rapid heating. Followed by a very quick melting, and a very sharp increase in resistance and a high PTC ratio. This is possible because of the high melt enthalpy and a narrow melting peak of the semi-crystalline material.

Suitable semi-crystalline material to be used in the present invention has preferably narrow melt peak as determined by DSC. Preferably on- and off-set temperatures for melting should differ maximum by 20° C. from the melting point.

Furthermore, suitable semi-crystalline material to be used in the present invention has preferably a low molecular weight and narrow melting point range. Low molecular weight allows semi-crystalline material to respond faster to temperature changes.

In one preferred embodiment, the semi-crystalline material has a degree of crystallinity of at least 5%. In another preferred embodiment, the semi-crystalline thermoplastic material has a degree of crystallinity of at least 10%. In still another preferred embodiment, the semi-crystalline thermoplastic material has a degree of crystallinity of at least 15%.

The semi-crystalline material is selected from the group consisting of polyethylene, polypropylene, polyvinyls, nylon, polyethylene terephthalate, polybutylene terephthalate, polyoxymethylene, natural polymers, hydrocarbon waxes, modified alkyl acrylate polymers and mixtures thereof. Preferably, hydrocarbon waxes comprise more than 95% alkane, mainly normal paraffin with straight chains and are fully saturated. Preferably, the semi-crystalline material is selected from the group consisting of natural polymers and hydrocarbon waxes.

Suitable commercially available semi-crystalline material to be used in the present invention is for example Dilavest P86 from Paramelt.

A PTC composition comprises a semi-crystalline material from 0.5 to 70% by weight of the total composition, preferably from 20 to 60%, more preferably from 23 to 50% and most preferably from 25 to 40%.

A Binder

A PTC composition comprises at least one binder. The binder used in the PTC composition may be selected from any binder currently used in the industry.

In general, at least one binder is selected from the group consisting of thermoplastic polyurethanes, polyesters, polyacrylates, polysiloxanes, halogenated vinyl or vinylidene polymers, polyamide copolymers, phenoxy resins, polyethers, polyketones, polyvinyl butyral, polyvinyl pyrrolidone, polyacrylates and mixtures thereof. Preferably, at least one binder is selected from the group consisting of thermoplastic polyurethanes.

The thermoplastic polyurethanes are preferred binders because they provide good adhesion and flexibility and they do not interfere with the mechanical integrity of the film.

In one embodiment, the PTC composition comprises at least two binders. In this embodiment, the first binder is selected from the group consisting of thermoplastic polyurethanes, polyesters, polyacrylates, polysiloxanes, halogenated vinyl or vinylidene polymers, polyamide copolymers, phenoxy resins, polyethers, polyketones, polyvinyl butyral, polyvinyl pyrrolidone, polyacrylates and mixtures thereof, and the second binder is selected from the group consisting of ethylene vinyl acetate polymers, poly vinyl alcohol, ethylene alkyl acrylate copolymers and mixtures thereof.

In preferred embodiment the first binder is thermoplastic polyurethane and the second binder is ethylene vinyl acetate. In this embodiment, the second binder is used to improve the printability of the composition.

Suitable commercially available binder material to be used in the present invention are for example Estane 5715 from Lubrizol and Elwax 40W from Du Pont.

A PTC composition according to the present invention comprises at least one binder from 0.5 to 8.5% by weight of the total weight of the composition, preferably from 2.5 to 7.5% and more preferably from 4 to 6%.

A PTC composition comprises at least two binders from 1 to 10% by weight of the total weight of the composition, preferably from 3.5 to 10% and more preferably from 5.75 to 8.25%.

The current binder quantity in the composition is ideal, because higher quantities would interfere negatively with the PTC ratio. In addition, lower levels than 0.5% by weight of the total weight of the composition would decrease the adhesion properties and the PTC ratio.

An Electronically Conductive Material

A PTC composition comprises an electronically conductive material. Suitable electronically conductive material is for example metal powders and carbon black. Carbon black is one material that has been used in PTC materials. Carbon black is one of the most frequently used conductive fillers for polymer based PTC materials. Some of the advantages of using carbon black as compared to electronically conductive metal materials include a lower cost price and a lower density.

The preference of the electronically conductive material depends on the application. For example if certain resistance levels are required, combination of carbon black and graphite is preferred electronically conductive material. On the other hand, for the materials which require more conductivity, the electronically conductive material, which is more conductive, like silver or metal alloys, can be used and are preferred.

In general, the electronically conductive material is selected from the group consisting of silver, nickel, carbon, carbon black, graphite, graphene, copper, silver coated copper, silver coated graphite, gold, platinum, aluminum, iron, zinc, cobalt, lead, tin alloys and mixtures thereof. Preferably, the electronically conductive material is selected from the group consisting of graphite, carbon black and mixtures thereof.

Suitable commercially available electronically conductive material to be used in the present invention are for example Ensaco 250G from Timcal and Vulcan XC72R from Cabot Corporation.

In one particularly preferred embodiment, the PTC composition comprises graphite particles in combination with the carbon black. The graphite particles show an improved thermal conductivity, which can prevent the formation of hot spots in operation, i.e. when connected to a power source. In addition, the combination of carbon black and graphite is preferred because this particular blend gives the desired resistance levels. Furthermore, this particular combination also provides desired high PTC ratio.

Preferably, said electronically conductive material has a d50 particle size from 5 μm to 6.5 μm and more preferably about 5.9 μm. Preferably, said electronically conductive material has a d90 particle size from 11.5 μm to 13 μm and more preferably about 12 μm.

Preferably, said electronically conductive material has a particle surface area from 60 to 70 m$^2$/g and more preferably about 68 m$^2$/g.

A PTC composition comprises electronically conductive material from 0.5 to 15% by weight of the total weight of the composition, more preferably from 4.5 to 12% and most preferably from 6 to 11%.

The current electronically conductive material quantity in the composition is ideal, because higher quantities would provide too high conductivity and therefore, would decrease the PTC ratio. On the other hand, quantities below 0.5% would provide high PTC ratio, however, material would not be conductive enough.

Solvent

A PTC composition may optionally comprise a solvent. Presence of a solvent depends on the form of the PTC composition. When the PTC composition is in the form of an ink, then the composition comprises a solvent. On the other hand, when the PTC composition is a paste or a hotmelt, it may comprise a solvent.

A wide variety of known organic solvents can be used in the present invention. Suitable solvents to be used in the present invention preferably have a flashpoint high enough to make the ink screen printable without the ink drying on the screen. Preferably, the flash point of the solvent is from 70 to 120° C.

It is also preferred that the solvents used in the present invention preferably also dissolve the additional binders and compatibilizers.

Suitable solvent to be used in the present invention is selected from the group consisting of alcohols, ketones, esters, glycol esters, glycol ethers, ethers and mixtures thereof. Preferably solvent is selected from butyl glycol acetate, carbitol acetate and mixtures thereof.

Suitable commercially available solvents to be used in the present invention are for example butyl glycol acetate and carbitol acetate from Eastman.

A PTC composition comprises a solvent from 5 to 80% by weight of the total weight of the composition, preferably from 10 to 70% and more preferably from 13 to 63%.

Ideal quantity of the solvent in the PTC composition depends on the application. For example, if the PTC composition is applied by screen printing, the solvent level is higher in order to gain ideal viscosity for screen printing.

Optional Ingredients

In addition to above mentioned ingredients a PTC composition may further comprise additional ingredients selected from the group consisting of dispersants, wetting agents, compatibilizers, levelling agents and mixtures thereof.

Preferably, the PTC composition has a Hegman value less than 40. Hegman value indicates the maximum particle size still in the formulation. The Hegman value depends on how the PTC composition is prepared.

For application of the ink in a screen printing process, preferably, the PTC composition according to the present invention has a viscosity from 5 to 45 Pas (15 s$^{-1}$) measured on a rheometer AR 1000 at constant shear rate with 20 mm plate-plate configuration (0.2 mm gap, 60 sec, 25° C.), preferably from 7.5 to 35 and more preferably from 10 to 30 Pas (15$^{-1}$).

For application of the ink in a screen printing process, preferably, the PTC composition has a thixotropic index from 2 to 15, preferably from 3 to 15 and more preferably from 4 to 9. The thixotropic index is calculated by dividing the viscosity at 1.5 s$^{-1}$ by viscosity at 15 s$^{-1}$.

For application by high speed printing processes such as flexoprinting or rotogravure printing, preferably the PTC composition according to the present invention has a viscosity from 0.2 to 10 Pas (15 s$^{-1}$) measured on a rheometer AR 1000 at constant shear rate with 20 mm plate-plate configuration (0.2 mm gap, 60 sec, 25° C.), preferably from 0.3 to 8 and more preferably from 0.5 to 5 Pas (15$^{-1}$).

Preferably, the PTC composition has a resistance from 1 to 1000 kΩ/sq/25 μm measured according to the following method. The design illustrated in FIG. 2 is screen printed and subsequently dried. The average resistance and thickness of the tracks is measured. Resistance is calculated by (R×thickness)/(# squares×25), wherein R is an average track resistance (kOhm), dry thickness (μm), # squares is 5(track length/track width) and 25 is normalisation to 25 μm.

Preferably, the PTC composition has a PTC ratio greater than 6. In preferred embodiment, PTC ratio is as high as possible. PTC ratio is the maximum resistance divided by the resistance at room temperature. A higher PTC ratio provides more safety.

Preferably, the PTC composition has a solid content from 30% to 60%, preferably from 35% to 55% and more preferably from 40% to 50%.

One way to prepare the PTC composition is to pre-dissolve the at least one binder into a solvent, if present. Subsequently, the micronized semi-crystalline material is added into the mixture and mixed with speed mixer till homogenous mixture is formed. The electronically conductive material is added into the mixture and mixed till homogenous mixture is formed. The formed mixture is triple roll milled.

EXAMPLES

Example 1

Figure 9:
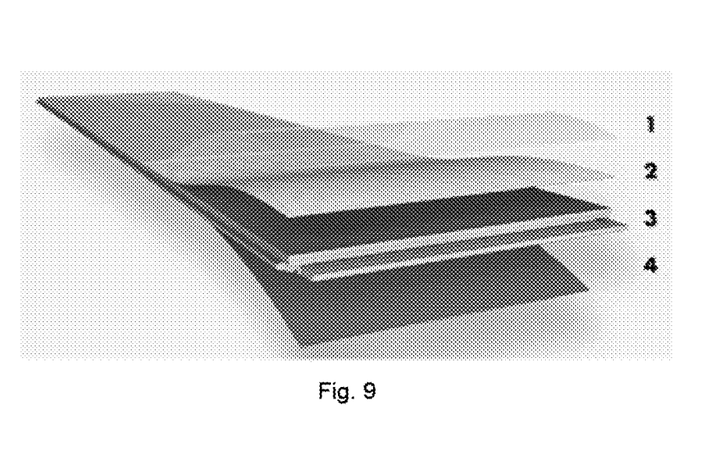
FIG. 9 illustrates the structure of example 1 according to the present invention.

Heating element according to the present invention was integrated into laminated floor The heating element according to the present invention was composed by the PTC composition (composition of example 4) and was directly integrated into the laminated floor structure. The PTC composition layer was applied on the underside of the substrate 2 (FIG. 9), and subsequently laminated together with the other layers. Busbars were printed on the underside of substrate 2 with silver ink Loctite ECI 1010 in a screen printing process. After drying of the ink, a positive temperature coefficient ink, Loctite ECI 8045, was screen-printed on top of the busbars in order to form a resistive layer. After drying this layer, a protective layer was printed on top (dielectric Loctite PF 455B) and cured. Subsequently, the standard lamination process was continued and a laminate was resulted, which had the heater integrated in itself. The heating element is sandwiched between layers 2 and 3.

By using an appropriate heater design and right level resistance PTC ink it is possible to connect the heater to the electricity grid (230V) so that it can be heated up. The thickness of the laminate element was increased only by <100 μm. Furthermore, in this way the heater was not visible.

Example 2

Figure 10A:
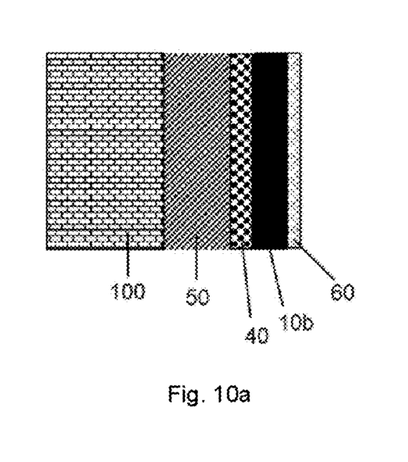
FIG. 10a illustrates a heating element integrated with a wall element.
Figure 10B:
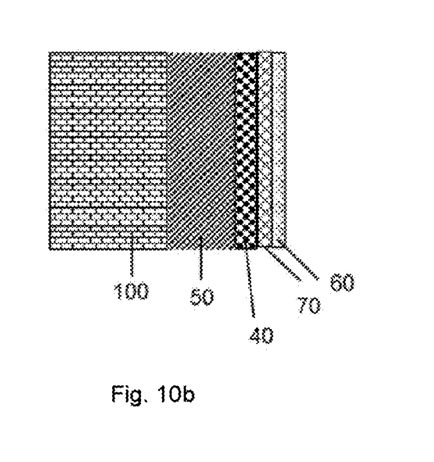
FIG. 10b illustrates an alternative embodiment of a heating element integrated with a wall element.

Heating element (Printed carbon PTC) is integrated into the wall element (FIGS. 10*a* and 10*b*).

Busbars were printed onto a PET (can also be paper or other) substrate with silver ink Loctite ECI 1010 by a screen printing process. After drying of the silver ink, a carbon PTC ink according to the present invention was screen-printed on top of the bus bars to form a resistive layer. After drying a carbon PTC ink layer, a protective layer was printed on top (dielectric Loctite PF 455B) and cured according to the recommended process. Formed heating element (40) was attached to a gypsum wall construction panel (100) by an adhesive (50). Subsequently, the heating element was overpainted by paint layer (60) and in this way the heater was no longer visible to the eye. This is illustrated in FIG. 10*a*.

In alternative embodiment, wall paper in this case a glass fibre reinforced wall paper (60) was adhered (70) on top of the heating element. This is illustrated in FIG. 10*b*.

Example 3

Figure 11:
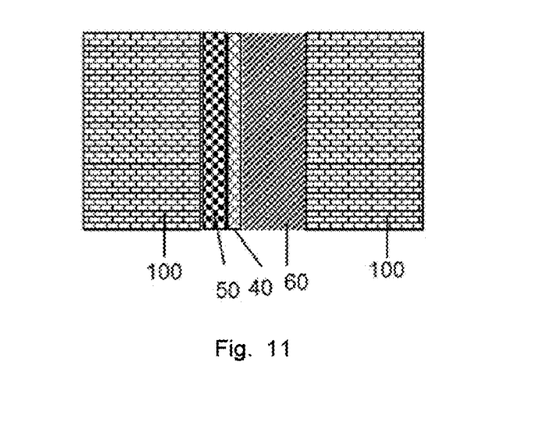
FIG. 11 illustrates the structure of example 3 according to the present invention.

Heating element was sandwiched between two construction elements. This is illustrated in FIG. 11.

Busbars were printed onto a first layer of a construction element (100)—a gypsum board in this case with silver ink Loctite ECI 1010 by using a screen printing process. After drying of the silver ink, a positive temperature coefficient ink, Loctite ECI 8045, was screen-printed on top of the bus bars to form a resistive layer. After drying of the PTC layer, a protective layer was printed on top (dielectric Loctite PF 4558) and subsequently cured according to the recommended process. The construction layer with heating element was attached to a second construction layer (100) by a thermally conductive adhesive (60). This way the heating element was sandwiched between two layers of construction material and was well protected from outside influences.

Example 4

Composition Examples

|  | Example 4.1 |
|---|---|
| 20% Estane 5717 in carbitol acetate | 26.28 |
| 10% Elwax 40W in butyl glycol acetate | 19.46 |
| Butyl glycol acetate | 12.18 |
| Ensaco 250 P (carbon black) | 7.64 |
| Carbitol acetate | 2.88 |
| Dilavest P86 (semi-crystalline material) | 31.56 |
| Melt enthalpy (J/g) | 216.9 |
| Viscosity at 15/s (Pas) | 73.9 |
| Viscosity at 1.5/s (Pas) | 638.0 |
| TI | 8.6 |
| PTC ratio (drying 10 min at 140° C.) | 31.3 |

Estane 5715 from Lubrizol; Elwax 40W from Du Pont; Ensaco 250P from Timcal; butyl glycol acetate from Eastman; carbitol acetate from Eastman. Dilavest P86 from Paramelt.

The example composition was prepared as described below.

Two pre-dissolved binder solutions were used: Estane 5715, is a binder which gives the mechanical properties, was first dissolved in butyl glycol acetate and a second binder Elvax 40W was also dissolved in butyl glycol acetate and is being used to give the ink an improved printability. The two binder solutions were mixed together with solvent and the semi-crystalline material in a speed mixer. The mixture was mixed till homogeneous and subsequently the electronically conductive material was added and the formed mixture was mixed till homogeneous. At last, the composition was triple roll milled. If the viscosity was too high, it was adjusted by adding some additional solvent. Desired viscosity depends on the how the PTC composition is applied. For example for the screen printing application the desired viscosity is from 10 to 30 Pas ($15^{-1}$).

The invention claimed is:
1. A construction element comprising,
a) a construction material;
b) a heating element comprising a positive temperature coefficient (PTC) composition layer, wherein said PTC composition layer comprises:
an electronically conductive material;
a semi-crystalline material;
a first binder;
a second binder; and
a solvent;
c) an adhesion layer applied to said heating element;
d) a substrate adhered to said adhesion layer, said heating element and said adhesion layer being embedded between said construction material and said substrate; and
e) a connector connected to the heating element,
wherein the semi-crystalline material is selected from the group consisting of polyethylene, polypropylene, polyvinyls, nylon, polyethylene terephthalate, polybutylene terephthalate, polyoxymethylene, natural polymers, refined hydrocarbon waxes and mixtures thereof,
wherein the first binder is selected from the group consisting of thermoplastic polyurethanes, polyacrylates, polysiloxanes, halogenated vinyl or vinylidene polymers, polyketones, polyvinyl pyrrolidone, and mixtures thereof;

wherein the second binder is selected from the group consisting of ethylene vinyl acetate polymers, ethylene alkyl acrylate copolymers and mixtures thereof; and wherein the solvent is selected from the group consisting of ketones, esters, glycol esters, glycol ethers and mixtures thereof or from the group consisting of butyl glycol acetate, carbitol acetate and mixtures thereof.

2. The construction element according to claim 1, wherein said heating element is covering at least 15% of athe surface of said construction material.

3. The construction element according to claim 2, wherein the thickness of said heating element comprising a PTC composition layer is from 2.5 µm to 100 µm.

4. The construction element according to claim 1, wherein the thickness of said heating element comprising the PTC composition layer is from 5 µm to 5 mm.

5. The construction element according to claim 1, wherein said PTC composition is in a form of an ink, a paste or a hotmelt.

6. The construction element according to claim 1, wherein the semi-crystalline material of said PTC composition comprises from 0.5to 70% by weight of the total composition.

7. The construction element according to claim 1, wherein at least one binder of the at least two binders of the PTC composition comprises from 0.5 to 8.5% by weight of the total weight of the composition.

8. The construction element according to claim 1, wherein the at least two binders of said PTC composition comprises from 1 to 10% by weight of the total weight of the composition.

9. The construction element according to claim 1, wherein said PTC composition comprises a conductive material selected from the group consisting of silver, nickel, carbon, carbon black, graphite, graphene, copper, silver coated copper, silver coated graphite, gold, platinum, aluminum, iron, zinc, cobalt, lead, tin alloys and mixtures thereof.

10. The construction element according to claim 1, wherein said PTC composition comprises an electronically conductive material from 0.5 to 15% by weight of the total weight of the composition.

11. The construction element according to claim 1, wherein the solvent of said PTC composition comprises said PTC composition comprises a solvent from 5 to 80% by weight of the total weight of the composition.

12. The construction element according to claim 1, wherein said construction element is a floor element, a wall element or a ceiling element.

13. The construction element according to claim 1, wherein the electronically conductive material is selected from the group consisting of silver, nickel, carbon, carbon black, graphite, graphene, copper, silver coated copper, silver coated graphite, gold, platinum, aluminum, iron, zinc, cobalt, lead, tin alloys and mixtures thereof.

14. The construction element according to claim 1, wherein the semi-crystalline material has a melt enthalpy greater than 150 J/g, measured according to ASTM E793.

15. The construction element according to claim 1, wherein the adhesion layer comprises a protective coating and an adhesive, the protective coating being made of a dielectric and conformal material.

* * * * *